US008645812B1

(12) United States Patent
Leeds

(10) Patent No.: US 8,645,812 B1
(45) Date of Patent: *Feb. 4, 2014

(54) METHODS AND APPARATUS FOR AUTOMATED REDACTION OF CONTENT IN A DOCUMENT

(75) Inventor: Bennett Leeds, Los Gatos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 740 days.

This patent is subject to a terminal disclaimer.

(21) Appl. No.: 12/857,849

(22) Filed: Aug. 17, 2010

Related U.S. Application Data

(63) Continuation of application No. 11/545,218, filed on Oct. 10, 2006, now Pat. No. 7,802,305.

(51) Int. Cl.
G06F 17/00 (2006.01)
(52) U.S. Cl.
USPC .......................................... 715/200; 715/255
(58) Field of Classification Search
USPC .................................................. 715/200, 255
See application file for complete search history.

(56) References Cited

U.S. PATENT DOCUMENTS

| | | | | |
|---|---|---|---|---|
| 5,363,473 A * | 11/1994 | Stolfo et al. | | 706/45 |
| 7,536,635 B2 | 5/2009 | Racovolis et al. | | |
| 7,546,334 B2 | 6/2009 | Redlich et al. | | |
| 7,711,191 B2 * | 5/2010 | Kosek et al. | | 382/181 |
| 7,802,305 B1 | 9/2010 | Leeds | | |
| 7,805,673 B2 * | 9/2010 | der Quaeler et al. | | 715/255 |
| 8,456,654 B2 * | 6/2013 | Kelly et al. | | 358/1.13 |
| 8,468,244 B2 * | 6/2013 | Redlich et al. | | 709/225 |
| 8,533,078 B2 * | 9/2013 | Schrichte | | 705/34 |
| 2004/0088313 A1 * | 5/2004 | Torres | | 707/101 |
| 2006/0218149 A1 | 9/2006 | Patrick | | |
| 2006/0242558 A1 * | 10/2006 | Racovolis et al. | | 715/511 |
| 2006/0253418 A1 * | 11/2006 | Charnock et al. | | 707/1 |
| 2006/0277220 A1 | 12/2006 | Patrick et al. | | |
| 2007/0030528 A1 | 2/2007 | Quaeler et al. | | |
| 2007/0094594 A1 * | 4/2007 | Matichuk et al. | | 715/530 |
| 2007/0113293 A1 | 5/2007 | Blumenau | | |
| 2008/0204788 A1 | 8/2008 | Kelly et al. | | |
| 2008/0288862 A1 * | 11/2008 | Smetters et al. | | 715/255 |
| 2009/0089663 A1 * | 4/2009 | Rebstock et al. | | 715/253 |
| 2010/0070396 A1 * | 3/2010 | Schrichte | | 705/34 |
| 2011/0035811 A1 * | 2/2011 | Rees et al. | | 726/29 |
| 2011/0107205 A1 * | 5/2011 | Chow et al. | | 715/255 |
| 2011/0119361 A1 * | 5/2011 | Issa et al. | | 709/223 |
| 2011/0247081 A1 * | 10/2011 | Shelton | | 726/28 |

OTHER PUBLICATIONS

Staddon et al., Web-Based Inference Detection, Google 2007, pp. 1-16.*
Lebovits, E-Filing: Mastering the Tech-Rhetoric, Google 2011, pp. 64-70.*
Kaariainen, Inferences in the Web, Google 2009, pp. 1-6.*

* cited by examiner

*Primary Examiner* — Cong-Lac Huynh
(74) *Attorney, Agent, or Firm* — Kilpatrick Townsend & Stockton LLP

(57) ABSTRACT

A redaction process obtains redaction data indicating content to be redacted in a document. In addition, the redaction process obtains non-redaction data indicating content not to be redacted in the document. Furthermore, the redaction process obtains proximity data indicating proximate expressions to be matched against the document. In this manner, the redaction process processes the redaction data, non-redaction data and proximity data against the document to produce a redact list and a potential list. Upon receiving user selections from both the redact and the potential lists, the redaction process applies a redaction function to the document to produce a redacted version of the document.

20 Claims, 6 Drawing Sheets

300
RECEIVE A CONFLICT RESOLUTION SELECTION FROM A USER, THE CONFLICT RESOLUTION SELECTION INDICATING AT LEAST ONE PREFERENCE FOR PROCESSING CONTENT IN THE REDACT LIST AND POTENTIAL LIST

301
RECEIVE A REDACTION PREFERENCE SELECTION FOR CONTENT IN THE DOCUMENT THAT IS IDENTIFIED IN BOTH THE REDACTION DATA AND THE NON-REDACTION DATA, WHEREIN IF CONTENT IN THE DOCUMENT IS IDENTIFIED IN BOTH THE REDACTION DATA AND NON-REDACTION DATA, THE IDENTIFIED CONTENT IS DESIGNATED FOR REDACTION BY A REDACTION FUNCTION

302
RECEIVE A PHRASE PREFERENCE SELECTION FOR CONTENT IN THE DOCUMENT THAT IS IDENTIFIED IN BOTH THE REDACTION DATA AND THE NON-REDACTION DATA, WHEREIN IF A WORD IN THE REDACTION DATA MATCHES A WORD CONTAINED WITHIN A PHRASE IN THE NON-REDACTION DATA, THE PHRASE IS NOT DESIGNATED FOR REDACTION BY THE REDACTION FUNCTION

AND/OR

303
RECEIVE A PRESERVATION PREFERENCE SELECTION FOR CONTENT IN THE DOCUMENT IDENTIFIED IN BOTH THE REDACTION DATA AND THE NON-REDACTION DATA, WHEREIN IF CONTENT IN THE DOCUMENT IS IDENTIFIED IN BOTH THE REDACTION DATA AND NON-REDACTION DATA, THE IDENTIFIED CONTENT IS NOT DESIGNATED FOR REDACTION BY THE REDACTION FUNCTION

304
RECEIVE A PHRASE PREFERENCE SELECTION FOR CONTENT IN THE DOCUMENT THAT IS IDENTIFIED IN BOTH THE REDACTION DATA AND THE NON-REDACTION DATA, WHEREIN IF A WORD IN THE NON-REDACTION DATA MATCHES A WORD CONTAINED WITHIN A PHRASE IN THE REDACTION DATA, THE PHRASE IS DESIGNATED FOR REDACTION BY THE REDACTION FUNCTION

*FIG. 6*

METHODS AND APPARATUS FOR AUTOMATED REDACTION OF CONTENT IN A DOCUMENT

CROSS REFERENCE TO RELATED APPLICATIONS

This Patent Application is a Continuation of U.S. patent application Ser. No. 11/545,218 filed on Oct. 10, 2006 now U.S. Pat. No. 7,802,305 entitled, "METHODS AND APPARATUS FOR AUTOMATED REDACTION OF CONTENT IN A DOCUMENT", the contents and teachings of which are hereby incorporated by reference in their entirety.

BACKGROUND

Conventional computer systems operate software applications that assist users in document processing and modifying information contained in such documents. Such software applications are commonly used to perform tasks for computer users such as word processing, graphic design, image processing and the like. Typically, these software applications provide users with a variety of tools that facilitate the modification of data within a document. More specifically, conventional software applications provide tools enabling a user to select data or other content, such as text or image data, within a document and to manipulate and/or delete the selected data (e.g., highlighting a text string in a word processing document and subsequently deleting the highlighted text, or changing the font of the highlighted text).

As another example, various conventional software applications include conventional redaction tools that allow a user to modify, or mark-up, text data within a document such that the data is unrecognizable and/or irretrievable by other users who have subsequent access to the document, but that keeps the documents original structure (e.g. pagination, paragraph sizes, etc.) in tact. Generally, such conventional redaction tools modify text within a document resulting in a 'black box' or similar rectangular graphical barrier that serves as a place-filler in lieu of the redacted text. An example application of a conventional software redaction tool involves the redaction of sensitive information contained in electronic documents as part of the discovery phase during litigation in a lawsuit or the removal of classified information from government documents that are released to the public.

SUMMARY

Conventional software applications that enable a user to redact data in a document suffer from a number of drawbacks. In particular, conventional document processing software applications that contain digital redaction techniques are limited in that these applications only provide means for redacting words that have been previously identified for redaction (vis-à-vis phrases, number sequences, etc.). Desktop redaction applications almost always enable a user to manually select what should be redacted, with some applications having an automation-assist function where words previously identified are either redacted or marked for redaction. Furthermore, these conventional software applications lack various contextual capabilities. For instance, such conventional software applications are not capable of determining when words should be redacted (or should not be redacted) depending on whether those words appear in certain phrases or other contextual structures. As a specific example, such conventional redaction techniques do not provide a mechanism for a user to specify a set of content such as a list of words to be kept in the document. As a result, manual review is often necessary to ensure accuracy after the automated redaction of a document by conventional means to ensure that words the user meant to retain in the document are not redacted.

Embodiments disclosed herein significantly overcome such deficiencies and provide a method for the automated redaction of documents by executing a redaction process that uses pre-configured lists containing content that should be redacted (e.g., redaction data) and content that should not be redacted (e.g., non-redaction data). In one configuration, the pre-configured lists are progressively developed and tailored to a specific user's preferences after every execution of the redaction process. As an example, the non-redaction data list may be a dictionary containing most common words and phrases. This non-redaction data specifies data or content that is not to be removed from the document. Conversely, the redaction data is a list of words or phrases that the user wants to have redacted from the document content. In operation, the redaction process applies the content (e.g. lists of words) in the redaction data and non-redaction data against a document to produce two intermediary lists. One intermediary list (e.g., a redact list) provides information regarding instances of content in the document that match content in the redaction list or, in other words, content (e.g., words, phrases, objects, etc.) that the user has previously identified for redaction. In addition, a second list (e.g., a potential list) displays content in the document that was in neither (i.e., that did not match) the redaction data nor the non-redaction data. As such, the potential list identifies foreign content (e.g., content that the user has not identified for redaction or non-redaction) in the document that the user may desire to redact.

In one configuration, the user can also supply (i.e. input) proximity data (e.g. as another list) indicating proximate expressions to be matched against the document. The redaction process processes the proximity data against the document to identify content that may be selected for redaction and adds content that matches the proximity data to the potential list as well. Thus after initial processing, the potential list includes content from the document that did not match either the redaction data (i.e. content the user specifically indicates to redact) nor the non-redaction data (i.e., content that should not be redacted), as well as content that match expressions in the proximity data. In this manner, a user can specify, for example, proximity data in the form of a regular expression that may match strings of text that the user may potentially want to redact. The redaction process adds these to the potential list, which allows the user to review content in this potential list for further addition to the content to actually be redacted. Once selections from the redact and potential lists are complete, the user can commit the redaction process to redact the selected content from these two lists. As a result, the user may select content from both the redact list and potential list for redaction. With the redaction data and non-redaction data modules, a user need not painstakingly create and/or update a new redaction scheme for subsequent applications of the redaction process to the same and/or other documents.

Furthermore, in configurations disclosed herein, the redaction process can include conflict resolution processing for words and/or phrases that appear in both the redaction data and non-redaction data. For example, the conflict resolution processing allows a user to select words that should (or should not) be redacted if those words appear in certain phrases that are identified in a document. Embodiments of the redaction process disclosed thus substantially overcome the aforementioned drawbacks.

Generally, as in one embodiment disclosed herein, a redaction process obtains redaction data indicating content to be redacted in a document. In addition, the redaction process obtains non-redaction data indicating content not to be redacted in the document. The redaction process also obtains proximity data indicating proximate expressions to be matched against the document. Furthermore, the redaction process processes the redaction data and the non-redaction data against the document to produce a redacted version of the document.

In another embodiment, the redaction process renders a redact list comprising instances of content in the document that match the content to be redacted in the redaction data. The redaction process also renders a potential list comprising instances of content in the document that did not match the content to be redacted in the redaction data and did not match the content not to be redacted in the non-redaction data. Furthermore, the redaction process receives, from a user, a redact selection of content to be redacted in the document from the redact list. In turn, the redaction process applies a redaction function to the redact selection to redact content matching the redact selection in the document. Similarly, the redaction process receives, from a user, a potential selection of content from the potential list from the user. Accordingly, the redaction process applies a redaction function to the potential selection to redact content matching the potential selection in the document.

In yet another embodiment, the redaction process obtains proximity data indicating proximate expressions to be matched against the document. Upon obtaining the proximity data, the redaction process processes the proximity data against the document to identify content that may be selected for redaction. In processing the proximity data, the redaction process matches proximity expressions against content in the document to identify proximate content. Furthermore, the redaction process renders the proximate content in the potential list.

In still yet another embodiment, the redaction process obtains redaction data indicating content that may be selected for redaction in an original document. Further, the redaction process obtains non-redaction data indicating content not to be redacted in the original document. In its operation, the redaction process renders a redact list comprising instances of content in the original document that match the content to be redacted in the redaction data. Additionally, the redaction process renders a potential list comprising instances of content in the original document that did not match the content to be redacted in the redaction data and did not match the content not to be redacted in the non-redaction data. In this manner, the redaction process receives, from a user, a redact selection that comprises content to be redacted in the original document from the redact list and the potential list. Furthermore, the redaction process applies a redaction function to the redact selection to redact content matching the redact selection in the original document, wherein the redaction function produces a redacted version of the document.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein. Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM, PROM or FPGA chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated® of San Jose, Calif.

BRIEF DESCRIPTION OF THE DRAWINGS

The foregoing and other objects, features and advantages of the invention will be apparent from the following more particular description of embodiments of the methods and apparatus for automated redaction of content in a document, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus for automated redaction of content in a document.

FIG. 6 is a flow chart of processing steps that shows high-level processing operations performed by the redaction process when it processes conflict resolution selections in accordance with one example configuration.

DETAILED DESCRIPTION

Figure 1:
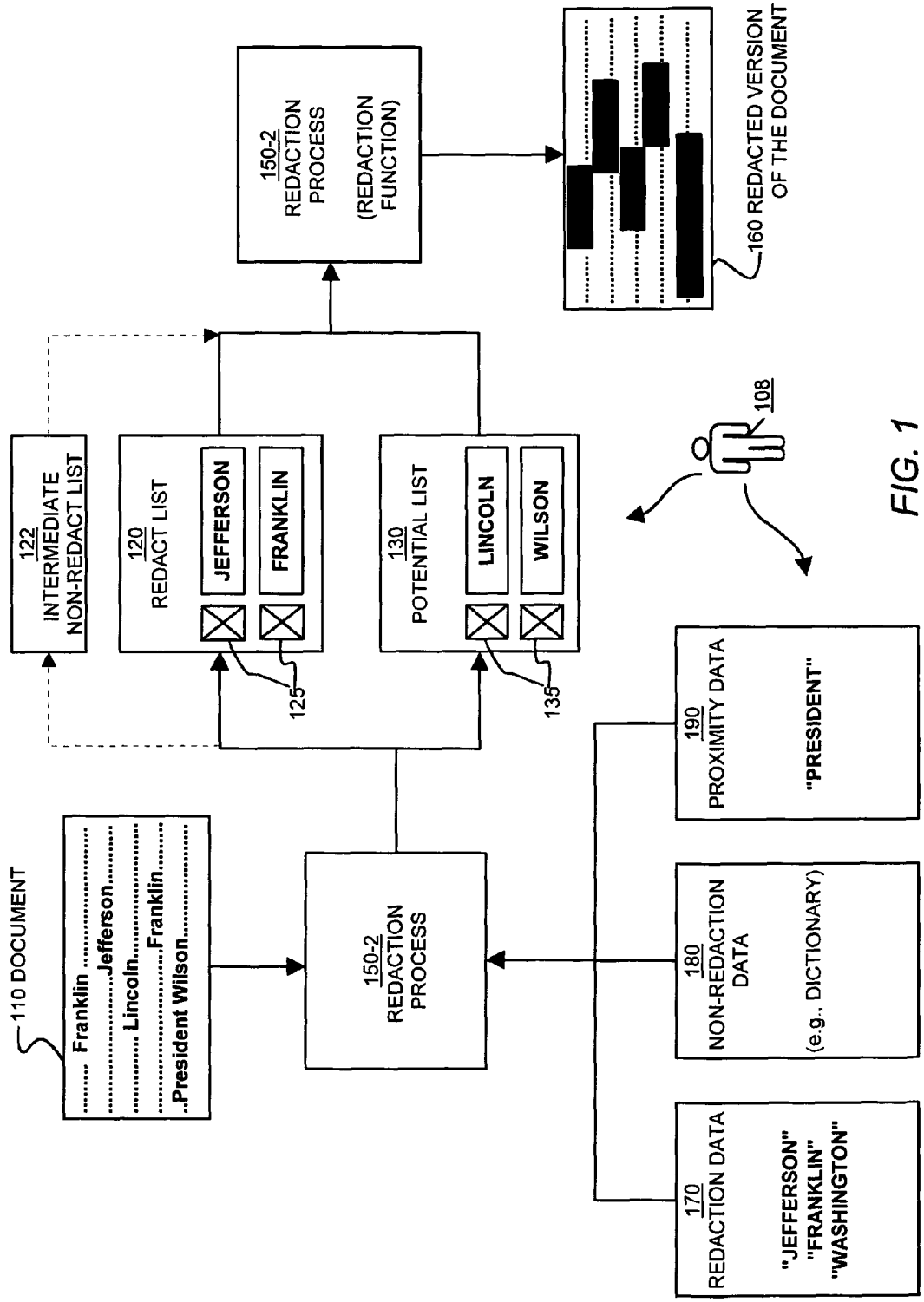
FIG. 1 is a block that illustrates one implementation of the redaction process when it redacts data in a document to produce a redacted version of the document in accordance with one embodiment of the invention.

FIG. 1 is a block diagram depicting an example embodiment of a redaction process 150-2 that processes a document 110 to produce a redacted version of the document 160. In one embodiment, the redaction process 150-2 obtains redaction data 170 and non-redaction data 180 in order to process the document 110. In another embodiment, the redaction process 150-2 also obtains proximate data 190. Typically, the redaction data 170, non-redaction data 180 and proximity data 190 are established by a user (108 in FIG. 2) as pre-populated or pre-configured sets of words, phrases, content, pattern matching expression and/or objects, and the like. In its operation, the redaction process 150-2 processes the various sets of data to produce a redact list 120 and a potential list 130. In accordance with one embodiment as depicted in FIG. 1, a user 108 may select particular content identified in the redact list 120 and/or potential 130 for redaction. Upon receiving a selection of content to be redacted from the user 108, the redaction process 150-2 applies a redaction function (e.g., using any redaction application or algorithm generally known in the art) to produce a redacted version of the document 160. As such, the redacted version of the document 160 typically shows the content selected by the user for redaction as either removed, modified (e.g., wherein a "black box" replaces the identified content), and/or via similar means suitable for depicting redacted content in a document.

Figure 2:
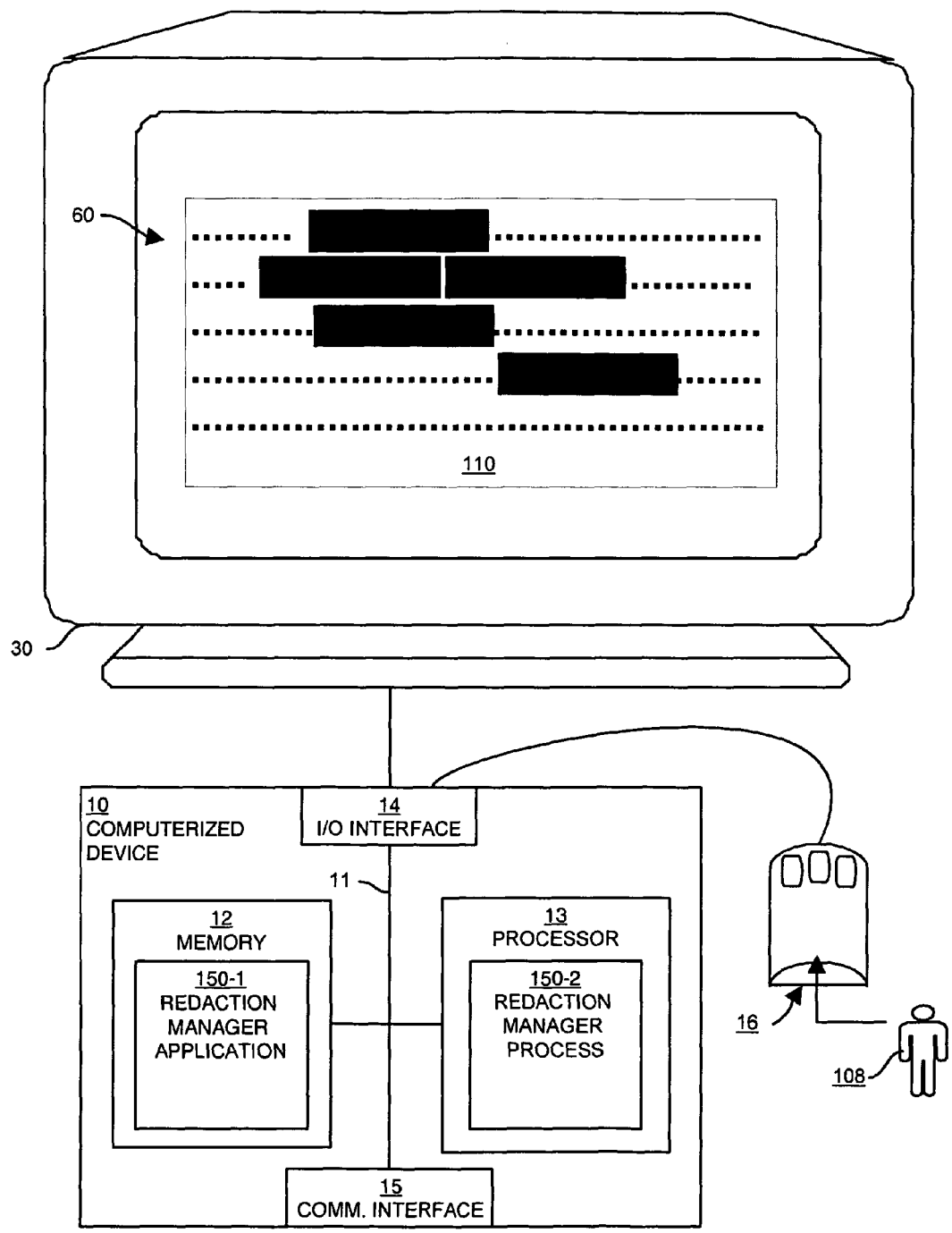
FIG. 2 is a block diagram of a computerized system configured with an application including a redaction process in accordance with one example configuration.

FIG. 2 is a block diagram illustrating example architecture of a computer system 10 that executes, runs, interprets, operates or otherwise performs a redaction application 150-1 and process 150-2 configured in accordance with embodiments of the invention. The computer system 110 may be any type of computerized device such as a personal computer, workstation, portable computing device, console, laptop, network terminal or the like. As shown in this example, the computer system 10 includes an interconnection mechanism 11 such as a data bus, motherboard or other circuitry that couples a memory system 12, a processor 13, an input/output interface 14, and a communications interface 15. An input device 16 (e.g., one or more user/developer controlled devices such as a keyboard, mouse, touch pad, etc.) couples to the computer system 10 and processor 13 through an input/output (I/O) interface 14 and enables a user 108 to provide input signals and generally control a graphical user interface 60 that the redaction application 150-1 and process 150-2 provides on the computer display 30.

The memory system 12 is any type of computer readable medium and in this example is encoded with a redaction application 150-1 that supports generation, display, and implementation of functional operations as explained herein. The redaction application 150-1 may be embodied as software code such as data and/or logic instructions (e.g., code stored in the memory or on another computer readable medium such as a removable disk) that supports processing functionality according to different embodiments described herein. During operation of the computer system 10, the processor 13 accesses the memory system 12 via the interconnect 11 in order to launch, run, execute, interpret or otherwise perform the logic instructions of the redaction application 150-1. Execution of the redaction application 150-1 in this manner produces processing functionality in a redaction process 150-2. In other words, the redaction process 150-2 represents one or more portions or runtime instances of the redaction application 150-1 (or the entire application 150) performing or executing within or upon the processor 13 in the computerized device 10 at runtime.

Further details of configurations explained herein will now be provided with respect to flow charts of processing steps that show the high level operations disclosed herein to perform the redaction process 150-2, as well as graphical representations that illustrate implementations of the various configurations of the redaction process 150-2.

Figure 3:
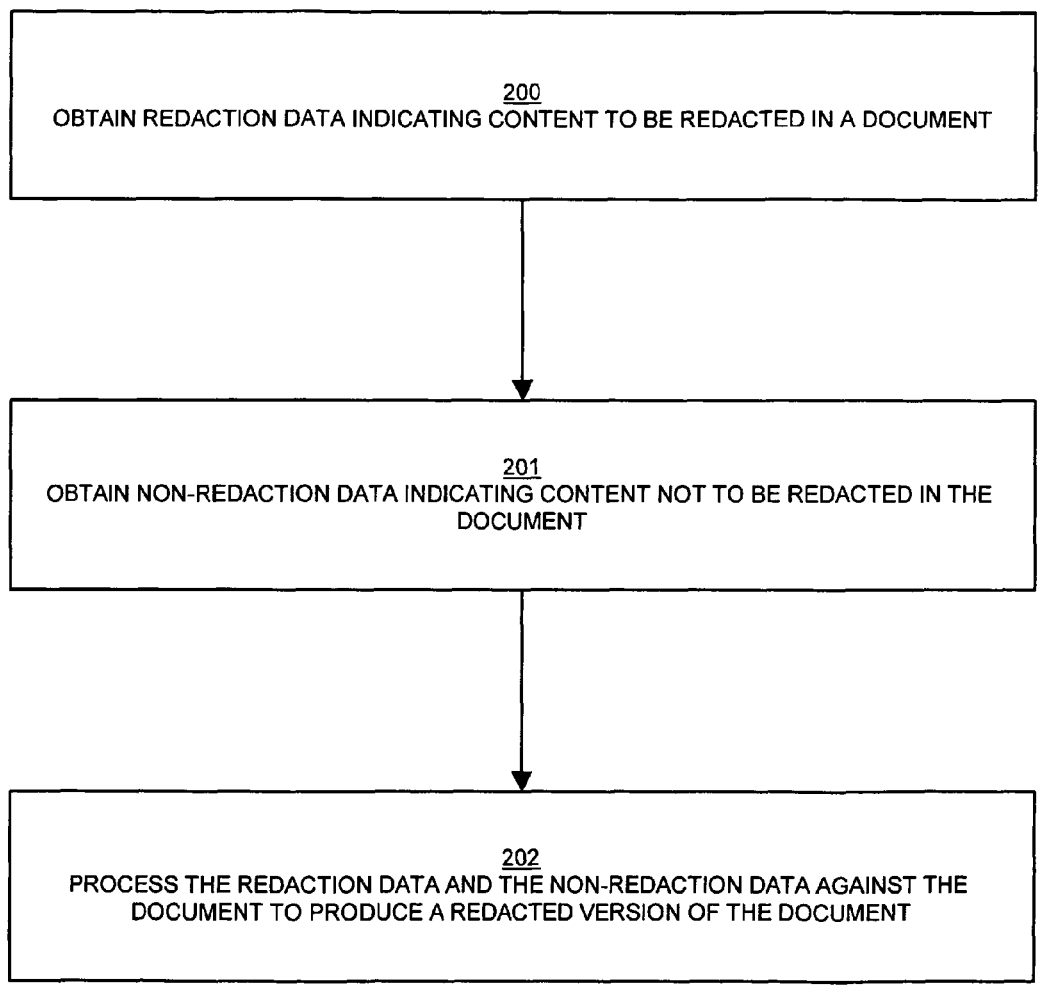
FIG. 3 is a flow chart of processing steps that shows high-level processing operations performed by the redaction process when it processes a document to produce a redacted version of the document in accordance with one example configuration.

FIG. 3 is a flow chart of processing steps that shows high-level processing operations performed by the redaction process 150-2 when it processes a document to produce a redacted version of the document in accordance with one example configuration.

In step 200, the redaction process 150-2 obtains redaction data 170 indicating content to be redacted in a document 110. Generally, as in one example embodiment, the redaction process 150-2 obtains redaction data 170 comprising words, phrases, pattern matching expressions (applicable to pattern matching/recognition functions), objects and/or the like. The objects may consist of graphics, metadata or other identifiable data within the document that is subject to the application of a redaction function. In one embodiment, the redaction data 170 is a set of words, phrases, pattern matching expressions and/or objects pre-configured by a user 108 within a file (or similar data structure) accessible by the redaction process 150-2. Typically, as in one example embodiment, the redaction data 170 contains names, phrases, addresses, number sequences (e.g., phone numbers, social security numbers, serial numbers, etc.), and/or similar unique information that not usually found within a standard dictionary. For instance, as shown in the example embodiment of FIG. 1, the redaction data 170 includes the names "Jefferson", "Franklin" and "Washington".

In step 201, the redaction process 150-2 obtains non-redaction data 180 indicating content not to be redacted in the document 110. Similar to the redaction data 170, the redaction process 150-2 obtains non-redaction data 180 comprising words, phrases, pattern matching expressions (applicable to pattern matching/recognition functions), objects and/or the like. The objects may consist of graphics, metadata or other identifiable data within the document that are subject to the application of a redaction function. As per one embodiment, the non-redaction data 180 is a set of words, phrases, pattern matching expressions and/or objects pre-configured by a user 108 within a file (or similar data structure) accessible by the redaction process 150-2. Generally, as in one example embodiment, the non-redaction data 170 contains substantially all identifiable words within a standard dictionary.

In step 202, the redaction process 150-2 processes the redaction data 170 and the non-redaction data 180 against the document 110 to produce a redacted version of the document 160. Details of such processing are discussed in more detail below by use of example embodiments and figures.

Figure 4:
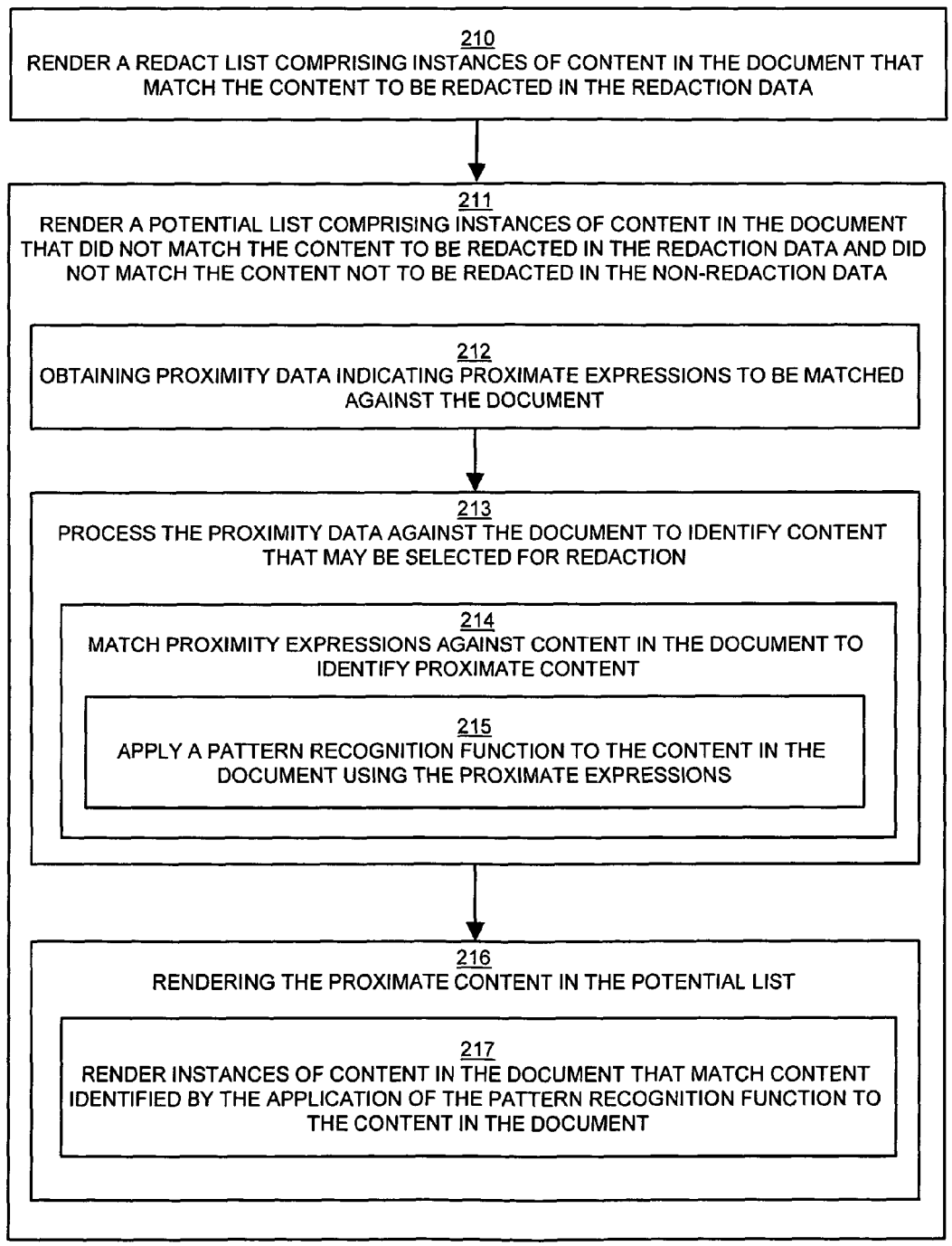
FIG. 4 is a flow chart of processing steps that shows high-level processing operations performed by the redaction process when it processes the redaction data and the non-redaction data to produce a redacted version of the document in accordance with one example configuration.

FIG. 4 is a flow chart of processing steps that shows high-level processing operations performed by the redaction process 150-2 when it processes the redaction data 170 and the non-redaction data 180 to produce a redacted version of the document 160 in accordance with one example configuration.

In step 210, the redaction process 150-2 renders a redact list 120 comprising instances of content in the document 110 that match the content to be redacted in the redaction data 170. In this manner, the redaction process 150-2 searches for instances of content in the document 110 and, consequently, displays the results of the search (e.g., in a graphical user interface "GUI"). As shown in the example embodiment of FIG. 1, the redaction process 150-2 searches the document 110 for instances of content that match the redaction data 170 (e.g., "Jefferson", "Franklin" and "Washington"). Accordingly, the redaction process renders (e.g., in a GUI) in the redact list 120 the matching instances of content (e.g., "Jefferson" and "Franklin" in this example) that occur in the document 110.

In another embodiment, the redaction process 150-2 may also render an intermediate non-redact list 122 including instances of content in the document 110 that match the content not to be redacted in the non-redaction data 180.

In step 211, the redaction process 150-2 renders a potential list 130 comprising instances of content in the document 110 that did not match the content to be redacted in the redaction data 170 and did not match the content not to be redacted in the non-redaction data 180. Stated differently, the potential list 130 comprises instances of foreign content in the document 110 that did not match content in either the redaction data 170 or non-redact 180 (e.g., words, phrases and/or objects in the document 110 that were in neither the redaction data 170 nor non-redaction data 180). For example, upon searching the document 110 the redaction process 150-2 procures the term "Lincoln" which does not match content in the redaction data 170 and non-redaction data 180 (assume for this example that the term "Lincoln" is not contained in the non-redaction data 180). As such, the redaction process 150-2 displays the potential list 130 (e.g., in a GUI) comprising the term "Lincoln".

In step 212, the redaction process 150-2 obtains proximity data 190 indicating proximate expressions 191 to be matched against the document 110. Generally, as in one embodiment, the redaction process 150-2 searches the document 110 for matching content contained in the proximity data 190. Upon finding a match of an instance of content in the document 110 with content in the proximity data 190, the redaction manager 150-2 identifies content in the document proximately located to the matching instance of content. For example, in one embodiment the redaction manager 150-2 searches for content immediately preceding and/or immediately following the matching instance of content in the document 110 (e.g., the word immediately before and/or immediately after the target content). As shown in the example embodiment in FIG. 1, the proximity data 190 includes the term "President". In this manner, the redaction process 150-2 will, during the processing, search for instances of "President" in the document 110 and, consequently, identify content in the document proximately located to those instances of "President" in the document 110. It should be noted that the proximate data may also include phrases, objects and the like, in which the redaction process 150-2 may search for matching instances in order to identify content proximately located to those instances in the document 110.

In step 213, the redaction process 150-2 processes the proximity data 190 against the document 110 to identify content that may be selected for redaction. In one embodiment, the redaction process 150-2 processes the proximity data 190 by searching the document 110 for matching instances of content. In turn, the redaction process 150-2 identifies content in the document 110 proximately located to the matching instances (e.g., immediately preceding and/or immediately following the matching instances of content).

In step 214, the redaction process 150-2 matches proximity expressions (e.g., words, phrases, pattern matching expressions, etc.) against content in the document to identify proximate content. For example, as depicted in the example embodiment in FIG. 1, the redaction process 150-2 searches the document 110 for matching instances of the term "President". Assume for this example that the redaction process 150-2 identifies proximate content located immediately after the instances of matching content. As such, the redaction process 150-2 in this example identifies the term "Wilson" since it is located immediately after the matching instance of the term "President".

In step 215, the redaction process 150-2 applies a pattern recognition, or pattern matching, function to the content in the document using the proximate expressions. The redaction process 150-2 may employ various pattern recognition applications known in the art to search the document 110 for content. For example, the pattern recognition function may search for various address patterns (e.g., street number and name combinations), number sequences (e.g., social security numbers), and/or other similar means for ascertaining patterns or common expressions in documents. In another example configuration, pattern recognition expressions may be in included in the redaction data 170 and/or non-redaction data 180 in order to identify content to be, or not to be, redacted in the document 110.

In step 216, the redaction process 150-2 renders the proximate content in the potential list 130. In addition to the information contained in the potential list 130 as previously discussed (e.g., foreign content identified in the document), the redaction process 150-2 also renders the proximate content in the potential list 130. In an alternative embodiment, the proximate content is rendered in a separate list designated solely for proximate content. As shown in the example embodiment of FIG. 1, the redaction process 150-2 displays (e.g., in a GUI) the proximate content (e.g., "Wilson") in the potential list 130.

In step 217, the redaction process 150-2 renders instances of content in the document 110 that match content identified by the application of the pattern recognition function to the content in the document 110. Similar to the proximate content example previously discussed, the redaction manager 150-2 displays (e.g., in a GUI) matching content identified by the application of the pattern recognition function to the document (e.g., matching instances of social security numbers) in the potential list 130.

Furthermore, in various example embodiments the redaction process 150-2 may present information to a user 108 in an on-the-fly phrase construction based hierarchical model. In one embodiment, adjacent redaction and/or potential target words may be grouped together into a single phrase. For instance, in the phrase "I went and visited Michael Jackson in the hospital," if the redaction process 150-2 identifies both "Michael" and "Jackson" as potential targets (because these words were not included in the non-redaction data 180), the single phrase "Michael Jackson" is returned in the potential list 130.

In yet another embodiment, words with the same capitalization, size, typeface, etc., are grouped together into a phrase. As an example, in the phrase "We all went to Spohn Memorial Hospital for a visit," the redaction process 150-2 identifies the word "Spohn" as a potential target since it does not occur in either the redaction data 170 or non-redaction data 180. The redaction process 150-2 then identifies that "Spohn" is capitalized and that the two words occurring directly afterward the word "Spohn" are also similarly capitalized. Thus, the redaction process 150-2 includes the phrase "Spohn Memorial Hospital" in the potential list 130.

In still yet another embodiment, content in the redact list 120 that are adjacent to content in the proximity data 190 can also be combined together to form phrases that would be listed in the potential list (and, again, with an identification that the potential phrase contains at least 1 word matching the redact input data).

In another embodiment, with respect to content in the redact list 120 and potential list 130, words and/or phrases that are part of other phrases identified in these lists are displayed (e.g., in a GUI) "underneath/inside" in a hierarchical fashion (e.g., collapsible and expandable lists), similar to folders inside of folders in a hierarchical file system display. For instance, if the phrase "Michael Joseph Jackson" was in a first location of the document 110, the phrase "Michael Jackson" was in a second location of the document 100, and the word "Jackson" in a third location of the document 110, the topmost phrase in the displayed (e.g., in a GUI) would be "Michael Joseph Jackson". Consequently, the redaction process 150-2 displays a symbol next to the phrase "Michael Joseph Jackson" indicating that sub-phrases were also found in the document. If a user 108 was to engage the symbol (e.g., clicking on the symbol in a GUI with an input device such as a mouse), the list would expand to reveal the sub-phrase "Michael Jackson," wherein the sub-phrase "Michael Jackson" would have a similar symbol indicating that sub-phrases were also found in the document (e.g., "Jackson"), and so on. If the word "Joseph" also occurred by itself in the document 110, it would be a child of the topmost "Michael Joseph Jackson" phase and would be similarly displayed in the collapsible/expandable format previously discussed.

Figure 5:
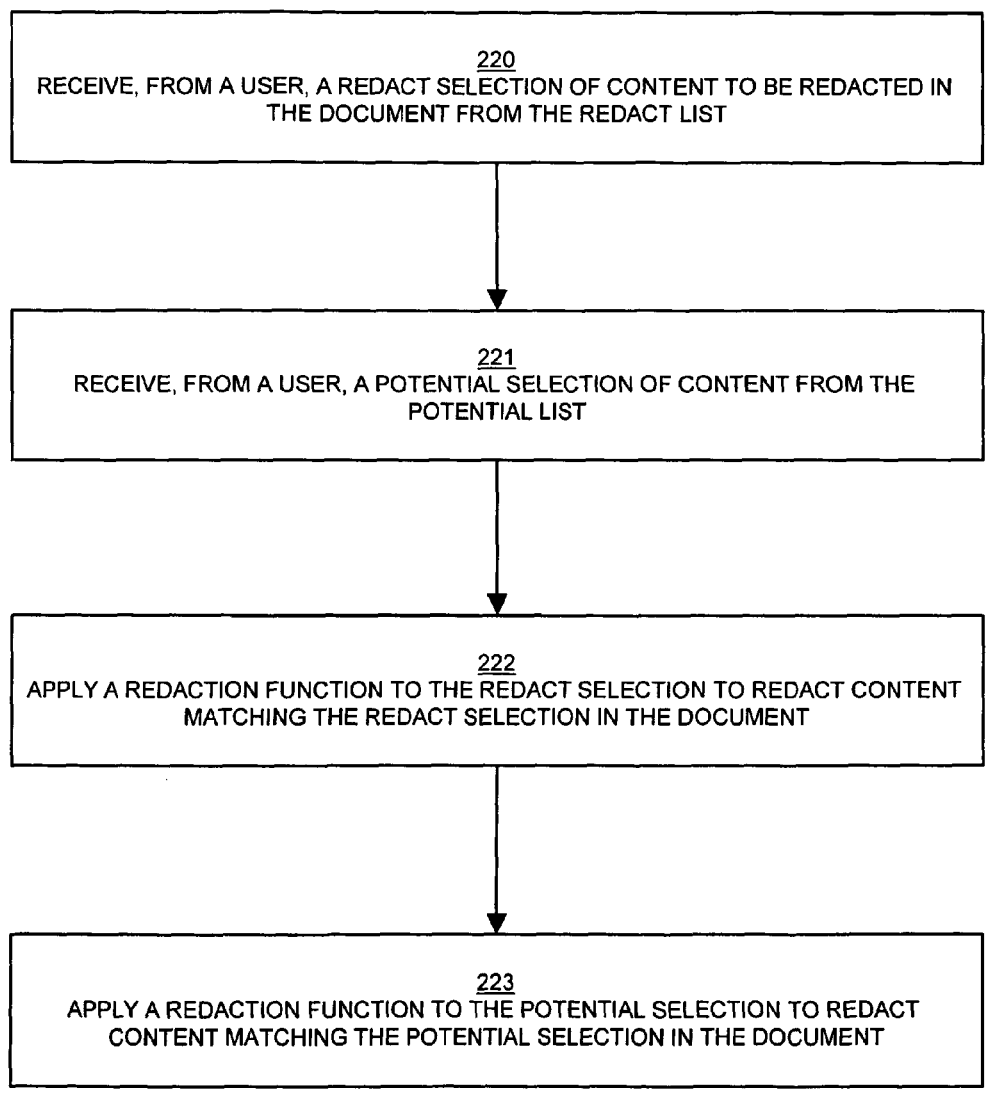
FIG. 5 is a flow chart of processing steps that shows high-level processing operations performed by the redaction process when it redacts content in a document in to produce a redacted version of the document accordance with one example configuration.

FIG. 5 is a flow chart of processing steps that shows high-level processing operations performed by the redaction process 150-2 when it redacts content in a document in accordance with one example configuration.

In step 220, the redaction process 150-2 receives, from a user 108, a redact selection 125 of content to be redacted in the document 110 from the redact list 120. In one embodiment, the user 108 may select (e.g., by toggling or checking interactive boxes located beside the instances of content in a GUI) particular instances of content to be redacted in the document 110 while electing to preserve other instances of content that have been identified by the redaction process 150-2 in the redact list 120. In an alternate embodiment the user 108 may select to redact the entire redact list 120 (e.g., by toggling or checking a box in a GUI designated for the wholesale selection of every instance of content in the redact list 120). As depicted in the example embodiment of FIG. 1, the redaction process 150-2 receives a redact selection 125 (shown as X'd boxes in the redact list 120) from a user 108 to redact the matching instances of "Franklin" and "Jefferson" in the document 110. Conversely, in another configuration the content in the redact list 120 is automatically redacted in the absence of a redact selection 125. As such, a user 108 may still elect to remove items from the redact list 125 before the application of the redaction function to the content in the document 110.

In step 221, the redaction process 150-2 receives, from a user 108, a potential selection 135 of content from the potential list 130. In accordance with an example embodiment, the user 108 may select (e.g., by toggling or checking interactive boxes located beside the instances of content in a GUI) particular instances of content to be redacted in the document 110 while electing to preserve other instances of content that have been identified by the redaction process 150-2 in the potential list 130. In another example embodiment the user 108 may select to redact the entire potential list 130 (e.g., by toggling or checking a box in a GUI designated for the wholesale selection of every instance of content in the potential list 130). As shown in the example embodiment of FIG. 1, the redaction process 150-2 receives a potential selection 135 (shown as X'd boxes in the potential list 130) from a user 108 to redact the matching instances of "Lincoln" (e.g., content in the document that did not match content in the redaction data 170 or non-redaction data 180) and "President" (e.g., proximate content in the document located immediately before to the term "Jefferson" as obtained from the proximity data 190) in the document 110.

In one configuration, a user 108 can review the potential list 130 and identify content from the potential list 130 to be moved to the redact list 120. At commit time (e.g., when the redaction function is applied to content in the document), only items in the redact list 120 are removed from the document 110. As a result, the content in the potential list 130 at commit time is treated as being in the intermediate non-redact list 122. In another configuration, a user 108 can review the potential list 130 and identify content from the potential redact list 130 to be moved to the intermediate non-redact list 122. Thus, at commit time, content in both the redact list 120 and potential list 130 are removed (e.g., redacted) from the document 110. The particular configuration that is chosen can be part of the application or made available as a user choice or preference item. Additionally, the most optimal configuration depends on the content in the document and the input data (e.g., redaction data 170 and non-redaction data 180). For example, if a user 108 finds that the potential list 130 includes more content to be redacted than content to be retained (or content not to be redacted), the latter configuration is optimal. In contrast, if the potential list 130 includes more content to be retained than content to be redacted, the former configuration is preferred.

In step 222, the redaction process 150-2 applies a redaction function to the redact selection 125 to redact content matching the redact selection in the document 110. The redaction process 150-2 may employ any typical redaction function known in the art to produce the redacted version of the document 160. For instance, in the example embodiment shown in FIG. 1, the redaction process 150-2 applies the redaction function to the redact selection 125 (e.g., "Franklin" and "Jefferson") such that the redacted version of the document 160 displays "black boxes" in lieu of the redacted content.

In step 223, the redaction process 150-2 applies a redaction function to the potential selection 135 to redact content matching the potential selection in the document. As shown in the example embodiment of FIG. 1, the redaction process 150-2 applies the redaction function to the potential selection 135 (e.g., "Lincoln" and "President") such that the redacted version of the document 160 displays "black boxes" in lieu of the redacted content.

FIG. 6 is a flow chart of processing steps that shows high-level processing operations performed by the redaction process 150-2 when it processes conflict resolution selections in accordance with one example configuration.

In step 300, the redaction process 150-2 receives a conflict resolution selection from a user. More specifically, the conflict resolution selection indicates at least one preference for processing content in the redact list and potential list. Generally, the conflict resolution selection provides a set of rules for the redaction process 150-2 to follow when instances of content (e.g., words, phrases, objects, etc.) in the document 110 match content in both the redact data 170 and non-redact data 180. In such a case when instances of content in the document 110 match content in both the redact data 170 and non-redact data 180, the redaction process 150-2 may automatically resolve the data conflict without querying the user 108. In addition, the conflict resolution selection provides rules for the redaction process 150-2 when a word in one data set (e.g., redaction data 170) conflict with a word contained within a phrase in the other data set (e.g., non-redaction data 180). Details of the conflict resolution selection processing are discussed in more detail below.

In step 301, the redaction process 150-2 receives a redaction preference selection for content in the document that is identified in both the redaction data 170 and the non-redaction data 180. In its application, if content in the document is identified in both the redaction data and non-redaction data, the identified content is designated for redaction by the redaction function. With the redaction preference selection, the redaction data 170 usurps the non-redaction data 180 when matching instances of content appear in both data sets (e.g., conflicting content). In one example embodiment, the redaction process 150-2 designates the identified content for redaction by the redaction function by including the identified content in the redact list 120. As such, a user may 108 still decide whether to remove the identified content from the redact list 120 before the identified content is automatically redacted.

For example, assume that the document 110 contains instances of the word "Adobe", and that both the redaction data 170 and non-redaction data 180 include the word "Adobe". Further assume that the redaction process 150-2 receives a redaction preference selection (e.g., from a user 108). In such a case, instances of the word "Adobe" in the document 110 are designated for redaction by the redaction function since the redaction preference selection gives superiority to words in the redaction data 170 vis-à-vis words in the non-redaction data 180. It should be noted that the redaction selection preference may be fine tuned to include features such as, but not limited to, case sensitive searching. For example, the word "Adobe" in the non-redaction data 180 may or may not match the word "adobe" in the redaction data 180 depending on the status of the case sensitive search.

In step 302, the redaction process 150-2 receives a phrase preference selection for content in the document that is identified in both the redaction data 170 and the non-redaction data 180. In its application, if a word in the redaction data matches a word contained within a phrase in the non-redaction data 180, the phrase is not designated for redaction by the redaction function. The phrase preference provides an exception to the redaction preference selection rule. In this case, even though the redaction preference selection is in effect, if the conflicting word is contained within a phrase in the non-redaction data 180, the phrase (along with the conflicting word) remains will not be subject to the application of the redaction function in the non-redaction data 180 in accordance with one embodiment. In one example embodiment, the redaction process 150-2 does not designate the identified content for redaction by the redaction function by including the identified content (e.g., the phrase) in the potential list 130. As such, a user may 108 still decide whether to remove the identified content (e.g., the phrase) from the potential list 130 before the identified content is automatically redacted.

For example, assuming that the document 110 contains instances of the word "Adobe", further assume that the redaction data 170 includes the word "Adobe" while the non-redaction data 180 includes the phrase "Adobe Acrobat Reader". With the phrase preference selection, instances of the phrase "Adobe Acrobat Reader" in the document 110 are preserved (or are not designated for redaction by the redaction function) even though the redaction process 150-2 received a redaction preference selection for the word "Adobe".

In step 303, the redaction process 150-2 receives a preservation preference selection for content in the document identified in both the redaction data 170 and the non-redaction data 180. More specifically, if content in the document is identified in both the redaction data 170 and non-redaction data 180, the identified content is not designated for redaction by the redaction function. With the preservation preference selection, the non-redaction data 180 usurps the redaction data 170 when matching instances of content appear in both data sets (e.g., conflicting content). In one example embodiment, the redaction process 150-2 does not designate the identified content for redaction by the redaction function by including the identified content in the potential list 130. As such, a user may 108 still decide whether to remove the identified content from the potential list 130 before the identified content is automatically redacted.

As an example, assume once again that the document 110 contains instances of the word "Adobe", and that both the redaction data 170 and non-redaction data 180 include the word "Adobe". Further assume that the redaction process 150-2 receives a preservation preference selection (e.g., from a user 108). In such a case, instances of the word "Adobe" in the document 110 are not designated for redaction by the redaction function since the preservation preference selection gives superiority to words in the non-redaction data 180 vis-à-vis words in the redaction data 170. It should be noted that the preservation selection preference may be fine tuned to include features such as, but not limited to, case sensitive searching. For example, the word "Adobe" in the non-redaction data 180 may or may not match the word "adobe" in the redaction data 180 depending on the status of the case sensitive search.

In step 304, the redaction process 150-2 receives a phrase preference selection for content in the document that is identified in both the redaction data 170 and the non-redaction data 180. In its application, if a word in the non-redaction data 180 matches a word contained within a phrase in the redaction data 170, the phrase is designated for redaction by the redaction function. Similar to the example previously discussed, the phrase preference provides an exception to the preservation preference selection rule. In this case, even though the preservation preference selection is in effect, if the conflicting word is contained within a phrase in the redaction data 170, the phrase (along with the conflicting word) will be subject to application of the redaction function in accordance with one embodiment. In one example embodiment, the redaction process 150-2 designates the identified content for redaction by the redaction function by including the identified content (e.g., the phrase) in the redact list 120. As such, a user may 108 still decide whether to remove the identified content (e.g., the phrase) from the redact list 120 before the identified content is automatically redacted.

For example, still assuming that the document 110 contains instances of the word "Adobe", further assume that the non-redaction data 180 includes the word "Adobe" while the redaction data 170 includes the phrase "Adobe Acrobat Reader". With the phrase preference selection, instances of the phrase "Adobe Acrobat Reader" in the document 110 are designated for redaction by the redaction function even though the redaction process 150-2 received a preservation preference selection for the word "Adobe".

In another embodiment, the conflict resolution is a user-specified ranking system where the options are the three types of data (words, phrases, expressions) and the three types of list processing (e.g., redaction data 170, non-redaction data 180 and proximity data 190). Each of the six categories would be ranked prior to the processing of the document 110 and, as a result, any conflicts are resolved by using the highest category representing the content being decided upon.

In yet another embodiment, the conflict resolution pairs each of the three input lists (e.g., redaction data 170, non-redaction data 180 and proximity data 190) with each of the three datum types in those lists (e.g., words, phrases, expressions). The user 108 then ranks the nine pairs of "input list/data" in anticipation of potential conflicts in the processing of the document 110. In this manner, for instance, a word included in a "Proximity Data/Phrase" pair would determine the outcome even if that word also matched a "Redaction Data/Word" pair.

It should be noted that due to the inclusion of pattern matching in various embodiments previously discussed, word/phrase conflicts are often best identified within the three intermediary lists (e.g., redact list 120, potential list 130 and intermediate non-redact list 122) rather than within the input lists (e.g., redaction data 170, non-redaction data 180 and proximity data 190). The use of the input lists in conflict resolution typically provides for optimal processing, while the use of the intermediate lists may typically produce superior results. Other types of conflict resolution behavior can also be usefully specified. For instance, the behavior could be specified that conflicting results should always be included in the potential list 130 only, enabling subsequent manual review.

In still yet another embodiment, different conflict resolution priorities and/or rules may be applied to specific items in any of the input lists (e.g., redaction data 170, non-redaction data 180 and proximity data 190). For example, even if the general conflict resolution rule is that all phrase matches are preferred over word or pattern matches, a user 108 could identify a specific word in the redact list 120 as having an overriding priority, thus forcing that word to be redacted even though it is part of a phrase that matches content in the non-redaction data 180 (or intermediate non-redact list 122) or in the proximity data 190.

In yet another embodiment, the conflict resolution processing described herein may be used on multiple documents at once. For example, the redaction process 150-2 presents results of the conflict resolution processing in a per document format, wherein the results are separated according to each document. In another embodiment, the redaction process 150-2 presents results as a whole over multiple documents such that the change and/or confirmation of potential conflicts may be performed across all documents involved in the processing.

It is noted that example configurations disclosed herein include the redaction application 150-1 itself (i.e., in the form of un-executed or non-performing logic instructions and/or data). The redaction application 150-1 may be stored on a computer readable medium (such as a floppy disk), hard disk, electronic, magnetic, optical or other computer readable medium. The redaction application 150-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the redaction application 150-1 in the processor 113 as the redaction process 150-2. In another alternative configuration, the redaction process 150-2 may be embedded in the operating system or may operate as a separate process from the application and may track all user input or only some user input (such as mouse movement or clicks, but not keyboard input). Those skilled in the art will understand that the computer system 110 may include other processes and/or software and hardware components, such as an operating system not shown in this example.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

What I claim is:

1. A method comprising:
   obtaining a redaction data, the redaction data for identifying content to be redacted from a document;
   obtaining a non-redaction data, the non-redaction data for identifying content to be retained by the document;
   detecting content in the document upon processing the redaction data and the non-redaction data against the document, wherein a presence of the detected content creates a conflict with respect to at least one of the redaction data and the non-redaction data, wherein detecting the conflict comprises determining that at least one phrase detected in the document is unaccounted for in both the redaction data and the non-redaction data; and
   receiving a preference to be associated with the detected content, wherein the preference resolves the conflict, wherein the preference comprises a request to include the detected at least one phrase in one of the redaction data and the non-redaction data.

2. The method as in claim 1, wherein detecting content in the document upon processing the redaction data and the non-redaction data against the document comprises:
   detecting a presence of at least one additional phrase in the document, the at least one additional phrase identified in the non-redaction data; and
   detecting the conflict upon determining the at least one additional phrase includes a word identified in the redaction data.

3. The method as in claim 2, wherein receiving the preference with regard to the detected content includes:
   receiving a phrase preference, the phrase preference overriding the redaction data with respect to the word included in the at least one additional phrase; and
   retaining the at least one additional phrase in the document in accordance with the non-redaction data.

4. The method as in claim 1, wherein detecting content in the document comprises:
   detecting at least one additional phrase, a first word from a portion of the at least one additional phrase, and a second word from the at least one additional phrase, wherein the at least one additional phrase, the first word, and the second word are detected at different locations in the document;
   detecting the conflict upon determining the portion of the at least one additional phrase is unaccounted for in both the redaction data and the non-redaction data, wherein the second word is identified in the redaction data; and
   displaying the at least one additional phrase, the portion of the at least one additional phrase, the first word and the second word at respective levels of a hierarchical tree.

5. The method as in claim 4, wherein displaying the at least one additional phrase, the portion of the at least one additional phrase, the first word and the second word at respective levels of the hierarchical tree comprises:
   rendering the at least one additional phrase as a selectable root of an expandable hierarchical tree;
   upon receiving a selection of the selectable root, rendering the portion of the at least one additional phrase and the second word as respective selectable nodes at a first hierarchical tree level below the selectable root; and upon receiving selection of a first selectable node corresponding to the portion of the at least one additional phrase, rendering the first word as a second selectable node at a second hierarchical tree level beneath the first hierarchical tree level.

6. The method as in claim 1, wherein detecting content in the document upon processing the redaction data and the non-redaction data against the document comprises:
   detecting a presence of a phrase in the document, the at least one additional phrase identified in the redaction data; and
   detecting the conflict upon determining the at least one additional phrase includes a word identified in the non-redaction data.

7. The method as in claim 6, wherein receiving the preference with regard to the detected content includes:
   receiving a phrase preference, the phrase preference overriding the non-redaction data with respect to the word included in the at least one additional phrase; and
   redacting the at least one additional phrase from the document in accordance with the redaction data.

8. The method of claim 1, wherein determining that the at least one phrase detected in the document is unaccounted for in both the redaction data and the non-redaction data comprises determining that the at least one phrase is not included in the content to be redacted as identified in the redaction data and is not included in the content to be retained as identified in the non-redaction data.

9. The method of claim 1, further comprising:
   based on determining that the at least one phrase detected in the document is unaccounted for in both the redaction data and the non-redaction data, providing an interface displaying the at least one phrase and identifying the at least one phrase as being unaccounted for in both the redaction data and the non-redaction data.

10. The method of claim 9, wherein receiving the request comprises receiving a selection of the at least one phrase in the interface.

11. The method of claim 1, further comprising:
    processing the redaction data and the non-redaction data against an additional document;
    detecting the at least one phrase in the additional document; and
    retaining or redacting the at least one phrase based on the one of the redaction data and the non-redaction data being updated with the at least one phrase.

12. A non-transitory computer readable storage medium comprising executable instructions encoded thereon operable on a computerized device to perform processing comprising:
    obtaining a redaction data, the redaction data for identifying content to be redacted from a document;
    obtaining a non-redaction data, the non-redaction data for identifying content to be retained by the document;
    detecting content in the document upon processing the redaction data and the non-redaction data against the document, wherein a presence of the detected content creates a conflict with respect to at least one of the redaction data and the non-redaction data, wherein detecting the conflict comprises determining that at least one phrase detected in the document is unaccounted for in both the redaction data and the non-redaction data; and
    receiving a preference to be associated with the detected content, wherein the preference resolves the conflict, wherein the preference comprises a request to include the at least one phrase in one of the redaction data and the non-redaction data.

13. The non-transitory computer readable storage medium as in claim 12, wherein detecting content in the document upon processing the redaction data and the non-redaction data against the document comprises:
    detecting a presence of at least one phrase in the document, the at least one additional phrase identified in the non-redaction data; and
    detecting the conflict upon determining the at least one additional phrase includes a word identified in the redaction data.

14. The non-transitory computer readable storage medium as in claim 13, wherein receiving the preference with regard to the detected content includes:
    receiving a phrase preference, the phrase preference overriding the redaction data with respect to the word included in the at least one additional phrase; and
    retaining the at least one additional phrase in the document in accordance with the non-redaction data.

15. The non-transitory computer readable storage medium as in claim 12, wherein detecting content in the document comprises:
    detecting at least one additional phrase, a first word from a portion of the at least one additional phrase, and a second word from the at least one additional phrase, wherein the at least one additional phrase, the first word, and the second word are detected at different locations in the document;
    detecting the conflict upon determining the portion of the at least one additional phrase is unaccounted for in both the redaction data and the non-redaction data, wherein the second word is identified in the redaction data; and
    displaying the at least one additional phrase, the portion of the at least one additional phrase, the first word and the second word at respective levels of a hierarchical tree.

16. The non-transitory computer readable storage medium as in claim 15, wherein displaying the at least one additional phrase, the portion of the at least one additional phrase, the first word and the second word at respective levels of the hierarchical tree comprises:
    rendering the at least one additional phrase as a selectable root of an expandable hierarchical tree;
    upon receiving a selection of the selectable root, rendering the portion of the at least one additional phrase and the second word as respective selectable nodes at a first hierarchical tree level below the selectable root; and
    upon receiving a selection of a first selectable node corresponding to the portion of the at least one additional phrase, rendering the first word as a second selectable node at a second hierarchical tree level beneath the first hierarchical tree level.

17. The non-transitory computer readable storage medium as in claim 12, wherein detecting content in the document upon processing the redaction data and the non-redaction data against the document comprises:
    detecting a presence of at least one additional phrase in the document, the at least one additional phrase identified in the redaction data; and
    detecting the conflict upon determining the at least one additional phrase includes a word identified in the non-redaction data.

18. The non-transitory computer readable storage medium as in claim 17, wherein receiving the preference with regard to the detected content includes:
    receiving a phrase preference, the phrase preference overriding the non-redaction data with respect to the word included in the at least one additional phrase; and redacting the at least one additional phrase from the document in accordance with the redaction data.

19. A computer system comprising:

a processor;

a memory unit storing instructions associated with an application executed by the processor; and an interconnect coupling the processor and the memory unit, wherein the processor is configured to execute the application and perform operations of:

obtaining a redaction data, the redaction data for identifying content to be redacted from a document;

obtaining a non-redaction data, the non-redaction data for identifying content to be retained by the document;

detecting content in the document upon processing the redaction data and the non-redaction data against the document, wherein a presence of the detected content creates a conflict with respect to at least one of the redaction data and the non-redaction data, wherein detecting the conflict comprises determining that at least one phrase detected in the document is unaccounted for in both the redaction data and the non-redaction data; and receiving a preference to be associated with the detected content, wherein the preference resolves the conflict, wherein the preference comprises a request to include the detected at least one phrase in one of the redaction data and the non-redaction data.

20. The computer system as in claim 19, comprising:

wherein detecting content in the document upon processing the redaction data and the non-redaction data against the document comprises:

detecting a presence of at least one additional phrase in the document, the at least one additional phrase identified in the non-redaction data; and detecting the conflict upon determining the at least one additional phrase includes a word identified in the redaction data;

wherein receiving the preference with regard to the detected content includes:

receiving a phrase preference, the phrase preference overriding the redaction data with respect to the word included in the at least one additional phrase; and retaining the at least one additional phrase in the document in accordance with the non-redaction data.

\* \* \* \* \*